United States Patent
Tenbrock et al.

(10) Patent No.: US 11,027,712 B2
(45) Date of Patent: Jun. 8, 2021

(54) COEFFICIENT-OF-FRICTION ESTIMATOR

(71) Applicants: ZF FRIEDRICHSHAFEN AG, Friedrichshafen (DE); WABCO EUROPE BVBA, Brussels (BE); TRW AUTOMOTIVE U.S. LLC, Livonia, MI (US)

(72) Inventors: Friedrich Tenbrock, Langenargen (DE); Sven Gohl, Immenstaad (DE); Christoph Schall, Weingarten (DE); Dan Williams, Carmel, IN (US); Stephan Kallenbach, Hannover (DE); Klaus Plähn, Seelze (DE); Thomas Dieckmann, Pattensen (DE); Ralph-Carsten Lülfing, Garbsen (DE)

(73) Assignees: ZF FRIEDRICHSHAFEN AG, Friedrichshafen (DE); WABCO EUROPE BVBA, Brussels (BE); TRW AUTOMOTIVE U.S. LLC, Livonia, MI (US)

( * ) Notice: Subject to any disclaimer, the term of this patent is extended or adjusted under 35 U.S.C. 154(b) by 134 days.

(21) Appl. No.: 16/313,962

(22) PCT Filed: May 16, 2017

(86) PCT No.: PCT/EP2017/061718
§ 371 (c)(1),
(2) Date: Dec. 28, 2018

(87) PCT Pub. No.: WO2018/001618
PCT Pub. Date: Jan. 4, 2018

(65) Prior Publication Data
US 2019/0193697 A1  Jun. 27, 2019

(30) Foreign Application Priority Data
Jun. 29, 2016 (DE) .................... 10 2016 211 728.9

(51) Int. Cl.
*B60T 8/1763* (2006.01)
*B60W 40/068* (2012.01)
(Continued)

(52) U.S. Cl.
CPC .......... *B60T 8/17633* (2013.01); *B60T 8/172* (2013.01); *B60T 8/1763* (2013.01); *B60T 8/1766* (2013.01);
(Continued)

(58) Field of Classification Search
CPC ..................... B60T 2210/12; B60W 2552/40
(Continued)

(56) References Cited

U.S. PATENT DOCUMENTS 4,779,447 A    10/1988  Rath
5,892,139 A *   4/1999  Miyazaki ............... B60T 8/172
                                                  73/146
(Continued)

FOREIGN PATENT DOCUMENTS

EP  1950116 A1  7/2008
EP  1967433 A1  9/2008
EP  1995091 A2  11/2008

OTHER PUBLICATIONS

International Search Report (English Translation) PCT/EP2017/061718 dated Aug. 9, 2017. (3 pages).

*Primary Examiner* — Atul Trivedi
(74) *Attorney, Agent, or Firm* — Dority & Manning, P.A.

(57) ABSTRACT

A method for determining a coefficient-of-friction, the method including braking a first wheel of a vehicle such that a slip between the first wheel and a roadway is less than a slip between a second wheel of the vehicle and the roadway, and determining a coefficient-of-friction between the first (Continued)

wheel and the roadway based on the behavior of the first wheel during the braking. The method optionally including hazard braking the vehicle.

16 Claims, 1 Drawing Sheet

(51) Int. Cl.
  *B60T 8/1766* (2006.01)
  *B60T 8/1755* (2006.01)
  *B60T 8/172* (2006.01)

(52) U.S. Cl.
  CPC ....... *B60T 8/17551* (2013.01); *B60W 40/068* (2013.01); *B60T 2210/12* (2013.01); *B60W 2552/40* (2020.02); *B60W 2720/26* (2013.01)

(58) Field of Classification Search
  USPC .......................................................... 701/71
  See application file for complete search history.

(56) References Cited

U.S. PATENT DOCUMENTS

| | | | | |
|---|---|---|---|---|
| 6,533,367 | B1* | 3/2003 | Latarnik | B60T 8/175 303/113.2 |
| 8,983,748 | B2* | 3/2015 | Takahashi | B60W 30/00 701/70 |
| 9,751,533 | B2* | 9/2017 | Singh | B60C 23/20 |
| 2003/0151302 | A1* | 8/2003 | Anwar | B60T 8/17616 303/112 |
| 2003/0154012 | A1* | 8/2003 | Anwar | B60T 8/17616 701/71 |
| 2004/0124700 | A1* | 7/2004 | Luh | B60T 8/17616 303/163 |
| 2005/0234626 | A1* | 10/2005 | Shiiba | B60W 10/18 701/70 |
| 2005/0234628 | A1* | 10/2005 | Luders | B60T 8/1725 701/80 |
| 2006/0144121 | A1* | 7/2006 | Neubert | G01N 19/02 73/7 |
| 2007/0016354 | A1* | 1/2007 | Engel | B60T 8/172 701/80 |
| 2007/0050121 | A1 | 3/2007 | Ammon et al. | |
| 2008/0283325 | A1 | 11/2008 | Kodama et al. | |
| 2009/0012669 | A1 | 1/2009 | Takenaka et al. | |
| 2009/0187302 | A1 | 7/2009 | Takenaka et al. | |
| 2011/0015906 | A1* | 1/2011 | Bian | B60T 8/172 703/2 |
| 2011/0238251 | A1* | 9/2011 | Wright | B60W 30/18172 701/22 |
| 2013/0211621 | A1 | 8/2013 | Breuer et al. | |
| 2014/0041972 | A1* | 2/2014 | Kim | F16D 49/00 188/74 |
| 2015/0251658 | A1* | 9/2015 | Kato | B60T 8/172 701/22 |
| 2016/0053839 | A1* | 2/2016 | Putz | F16D 65/18 701/74 |
| 2016/0133130 | A1* | 5/2016 | Grimm | H04W 4/80 340/905 |
| 2016/0133131 | A1* | 5/2016 | Grimm | G08G 1/096725 701/117 |
| 2016/0251005 | A1* | 9/2016 | Morselli | B60T 7/20 701/50 |
| 2016/0347181 | A1* | 12/2016 | Yamakado | B60L 15/20 |
| 2017/0160745 | A1* | 6/2017 | Lauffer | B60W 30/18 |
| 2017/0182989 | A1* | 6/2017 | Takeda | B60T 8/18 |
| 2019/0210606 | A1* | 7/2019 | Hagenlocher | B60W 40/068 |
| 2020/0079381 | A1* | 3/2020 | Lombrozo | G05D 1/0276 |

\* cited by examiner

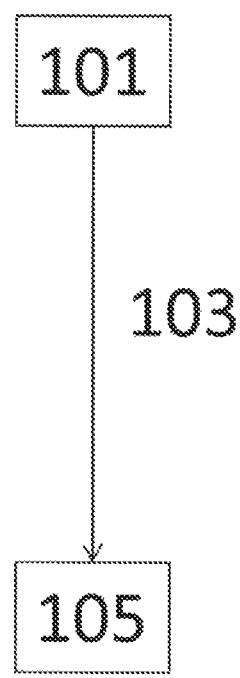

COEFFICIENT-OF-FRICTION ESTIMATOR

FIELD OF THE INVENTION

The invention relates generally to a method for estimating the coefficient-of-friction and to a vehicle in which the method is carried out.

BACKGROUND

Various driver assistance systems, such as an anti-lock braking system (ABS), vehicle dynamics control or electronic stability control (ESC), a run-flat system component (RSC), an advanced emergency braking system (AEBS), autonomous emergency braking (AEB), or avoidance assistants utilize, at start-up, an estimate of a coefficient-of-friction existing between the wheels of a vehicle and a roadway. The braking points of an AEBS are estimated, for example, based on the assumption of a dry road having a high level of skid resistance. An adaptation to the actually present coefficient-of-friction first takes place at the operating time. If the initial estimate deviates from the actual coefficient-of-friction, the aforementioned systems do not operate in an optimal manner after start-up.

The problem addressed by the invention is that of circumventing the inadequacies and disadvantages inherent in the solutions known from the prior art. In particular, the determination of a coefficient-of-friction between the wheels of a vehicle and a roadway needs to be more reliable and faster.

SUMMARY OF THE INVENTION

A friction value, which is also referred to as a friction coefficient or coefficient-of-friction, is defined as a quotient of a maximum frictional force and a contact force between two bodies. The contact force causes two friction surfaces, one on each of the two bodies, to be pressed against one another. The friction surfaces contact one another in two contact areas. Each of the contact areas corresponds to a friction surface or is a subarea of a friction surface. The contact force extends orthogonal with respect to the contact areas. The frictional force is a force which the friction surface exerts via friction in its contact areas opposing a displacement orthogonal with respect to the contact force. The maximum frictional force is a frictional force which is applicable, as the maximum, at a given contact force.

The method according to the invention provides braking of a first wheel of a vehicle such that a slip between the first wheel and a roadway is less than a slip between a second wheel of the vehicle and the roadway. The braking of the first wheel implies that the slip between the first wheel and the roadway is less than zero. The slip between the second wheel and the roadway can also be less than zero. This means, the second wheel may also be braked. Alternatively, the second wheel can freely rotate. In this case, there is no slip present. An acceleration of the second wheel while the first wheel is braked is also possible. This means, the slip between the second wheel and the roadway is greater than zero.

The roadway is a substrate on which the vehicle stands or travels. In particular, the first wheel and the second wheel are in contact with the substrate. In this case, the first wheel and the second wheel are each loaded with a portion of the vehicle weight.

According to the invention, a coefficient-of-friction between the first wheel and the roadway is determined based on the behavior of the first wheel during the braking. It is therefore provided according to the method to brake the first wheel so strongly that its slip is less than the slip of the second wheel. For example, the slip of the first wheel may be −1 and the slip of the second wheel may be zero. Due to the lesser slip of the first wheel, inferences are made, based on the behavior of the first wheel, regarding the coefficient-of-friction between the first wheel and the roadway. In particular, the coefficient-of-friction can be determined based on at least one physical variable which describes the behavior of the first wheel during the braking.

The method according to the invention is distinguished by the fact that, in the case of low deceleration of the vehicle, one individual wheel is transferable into a state in which strong slip occurs. Thus, strong slip occurs at the first wheel. Since the second wheel is braked less strongly, the second wheel freely rotates or is accelerated, and an excessive deceleration of the vehicle is avoidable.

In one preferred refinement, the coefficient-of-friction determined between the first wheel and the roadway is utilized as an estimate of a coefficient-of-friction between the second wheel and the roadway. This is based on the assumption of a homogeneous slip resistance of the individual wheels of the vehicle and of the roadway. In particular, it is assumed that the coefficient-of-friction between the second wheel and the roadway corresponds to the coefficient-of-friction between the first wheel and the roadway.

The principle of a strong braking of one individual wheel during a low deceleration of the vehicle, on which the invention is based, is increasingly applicable the more lightly the braked wheel is loaded. In one particularly preferred refinement, therefore, a wheel of the vehicle is braked, to which a particularly low dynamic wheel load is applied. According to the refinement, the first wheel and the second wheel are therefore selected such that a lower wheel load is applied to the first wheel during the braking than to the second wheel.

The dynamic wheel load typically increases from the rear toward the front during the brake application. In one preferred refinement, the first wheel is therefore situated further toward the rear, in the direction of travel, than the second wheel. In particular, in one embodiment, the first wheel is a rear wheel and the second wheel is a front wheel.

The maximum coefficient-of-friction results at the transition from static friction to kinetic friction. Correspondingly, in one preferred refinement, the first wheel is braked so strongly that it at least intermittently locks, i.e., the slip between the first wheel and the roadway is −1, at least intermittently. While the first wheel is locked, the second wheel continues to rotate.

The above-described ratio of the slip between the first wheel and the roadway and the slip between the second wheel and the roadway applies, in one further preferred refinement, continuously during the entire braking operation. Therefore, while the first wheel of the vehicle is braked, the slip between the first wheel and the roadway is preferably continuously less than the slip between the second wheel and the roadway.

A quantitatively determinable characteristic of a physical or technical object is referred to as a physical variable. The physical variables which influence the behavior of the first wheel during the braking include the slip between the first wheel and the roadway, a brake pressure present at the first wheel, and the wheel load acting on the first wheel during the brake application. The level of a brake torque acting on the first wheel directly depends on the brake pressure present at the first wheel. In one preferred refinement, one or several of the aforementioned variables is/are utilized for determining the coefficient-of-friction between the first wheel and the roadway.

The above-described method is particularly suitable for calibrating a braking system. An appropriate method for braking a vehicle includes a first step and a second step. In the first step, a coefficient-of-friction is determined by utilizing the method according to the invention or by utilizing a preferred refinement of this method. In the second step, hazard braking, which is also referred to as emergency braking or a full brake application, is carried out, which is distinguished by a preferably high deceleration of the vehicle. Preferably, the vehicle is braked during the hazard braking with a maximum possible deceleration.

The second step is carried out after the first step. In this case, the coefficient-of-friction determined in the first step is utilized for calibrating the braking system of the vehicle. A coefficient-of-friction which corresponds to the physical conditions actually prevailing between the wheels of the vehicle and the roadway is therefore already available at the beginning of the hazard braking.

The first step, i.e., the method according to the invention or a preferred refinement of this method, is automatically carried out in one preferred refinement for braking the vehicle. The automatic implementation is carried out, for example, in order to prepare for a hazard braking when the vehicle detects an imminent collision with an obstacle.

In one further preferred refinement, the second step is also automatically carried out. Such a refinement corresponds to the functionality of an emergency braking system.

In the case of a hazard braking carried out by an emergency braking system, the driver is usually warned in advance. An appropriate warning can take place, for example, in the form of a so-called warning braking action. In a warning braking action, the vehicle is braked with a slight deceleration, for example, with a deceleration of no more than 3.5 m/s$^2$. This is intended to signal to the driver about an impending hazard braking. In one preferred refinement, the warning braking action is carried out by implementing the method according to the invention or by implementing a refinement of this method.

The vehicle preferably comprises at least one control unit for carrying out the method according to the invention or a refinement of this method, in particular, for preparing for a hazard braking and in combination with an emergency braking system.

BRIEF DESCRIPTION OF THE DRAWING

The invention is described more specifically by example on the basis of the attached FIGURE. The following is shown:

The single FIGURE of the drawing shows a schematic illustration of an emergency braking system in accordance with aspects of the present subject matter.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

According to the FIGURE, a coefficient-of-friction estimator 101 is initially implemented. The coefficient-of-friction estimator determines a coefficient-of-friction 103 between the wheel and a roadway surface by locking a lightly loaded wheel in a targeted manner.

The coefficient-of-friction 103, is transferred, as an input parameter, to an emergency braking system 105 which is subsequently implemented.

Modifications and variations can be made to the embodiments illustrated or described herein without departing from the scope and spirit of the invention as set forth in the appended claims.

REFERENCE CHARACTERS 101 coefficient-of-friction estimator
103 coefficient-of-friction
105 emergency braking system

The invention claimed is:

1. A method for determining a coefficient-of-friction, the method comprising:
controlling, by at least one control unit, a braking system to brake a first wheel of a vehicle such that a slip between the first wheel and a roadway is less than a slip between a second wheel of the vehicle and the roadway; and
determining, by the at least one control unit, a coefficient-of-friction between the first wheel and the roadway based on the behavior of the first wheel during the braking.

2. The method of claim 1, wherein the coefficient-of-friction between the first wheel and the roadway is an estimate of a coefficient-of-friction between the second wheel and the roadway.

3. The method claim 1, wherein a lesser wheel load is applied to the first wheel than to the second wheel during the braking.

4. The method of claim 1, wherein the first wheel is situated rearwardly of the second wheel in a direction of travel of the vehicle.

5. The method of claim 1, wherein the first wheel is braked such that the first wheel at least intermittently locks.

6. The method of claim 1, wherein the slip between the first wheel and the roadway during the braking is continuously less than the slip between the second wheel and the roadway.

7. The method of claim 1, wherein one or more of the slip between the first wheel and the roadway, a brake pressure present at the first wheel, and a wheel load applied to the first wheel during the braking is utilized to determine the coefficient-of-friction between the first wheel and the roadway.

8. A vehicle comprising the at least one control unit, wherein the at least one control unit is programmed to implement the method of claim 1.

9. A method for braking a vehicle, the method comprising:
controlling, by at least one control unit, a braking system to brake a first wheel of a vehicle such that a slip between the first wheel and a roadway is less than a slip between a second wheel of the vehicle and the roadway;
determining, by the at least one control unit, a coefficient-of-friction between the first wheel and the roadway based on the behavior of the first wheel during the braking; and
after braking the first wheel, controlling, by the at least one control unit, the braking system to hazard brake the vehicle.

10. The method of claim 9, wherein one or both of the coefficient-of-friction between the first wheel and the roadway and the coefficient-of-friction between the second wheel and the roadway is utilized for open-loop or closed-loop control of the hazard braking.

11. The method of claim 9, wherein controlling the braking system to brake the first wheel of the vehicle comprises automatically controlling the braking system to brake the first wheel of the vehicle.

12. The method of claim 9, wherein controlling the braking system to hazard brake the vehicle comprises automatically controlling the braking system to hazard brake the vehicle.

13. The method of claim 9, wherein the vehicle is braked during the braking of the first wheel.

14. The method of claim 9, wherein the vehicle is braked during the braking of the first wheel with a deceleration less than a deceleration during the hazard braking of the vehicle.

15. The method of claim 14, wherein the deceleration of the vehicle during the braking of the first wheel is no more than 3.5 m/s$^2$.

16. A vehicle comprising the at least one control unit, wherein the at least one control unit is programmed to implement the method of claim 9.

\* \* \* \* \*